April 14, 1964 B. W. FOSTER Re. 25,555

VACUUM PUMP

Original Filed Nov. 27, 1959 2 Sheets-Sheet 1

INVENTOR.
BERRY W. FOSTER
BY A. Dehan Owen
ATTORNEY

VACUUM PUMP

Original Filed Nov. 27, 1959 2 Sheets-Sheet 2

INVENTOR.
BERRY W. FOSTER
BY
ATTORNEY

United States Patent Office

Re. 25,555
Reissued Apr. 14, 1964

25,555
VACUUM PUMP

Berry W. Foster, 1147 10th St., Santa Monica, Calif.

Original No. 2,993,639, dated July 25, 1961, Ser. No. 855,941, Nov. 27, 1959. Application for reissue Apr. 25, 1963, Ser. No. 276,145
11 Claims. (Cl. 230—95)

Matter enclosed in heavy brackets [ ] appears in the original patent but forms no part of this reissue specification; matter printed in italics indicates the additions made by reissue.

This invention relates to a vacuum pump, which may be used in numerous ways. For example, it may be used in a vacuum cleaner; it may be used for picking or moving agricultural crops such as cotton, wheat and nuts; and it may be used as a pump for moving or loading comminuted materials such as sand, gravel, pulverized coal, and ore. This application is a continuation-in-part of application Serial No. 803,687, filed April 2, 1959, and now abandoned.

An important feature of the vacuum pump of this invention is that the particles being pumped do not travel through any rotating or moving parts; only the pumping fluid and the pumped particles are in motion. Thus, this device can pump seed and fibers without damaging them. It excels prior-art pumps in moving abrasive and is better for moving larger-mass particles than conventional vacuum pumps which pass the particles through rotating machinery. It may be used in sand blasting. It is well adapted for use with a conventional compressed air system. It is much simpler to manufacture than conventional vacuum pumps, and the fact that the parts do not move also prolongs its operating life.

An important object of this invention is to provide a mechanical device that will generate a vortex with a high suction. By providing a vortex with considerable intensity and a small diameter core, extremely high suctions can occur in the core, as illustrated in nature by tornados and waterspouts.

This invention uses a whirlwind vortex pump of the type diclosed and claimed in my co-pending patent application, Serial Number 767,432, filed October 15, 1958, and now abandoned, which is used to lift and propel an aircraft in flight.

DESCRIPTION OF THE VACUUM PUMP

Figure 1:
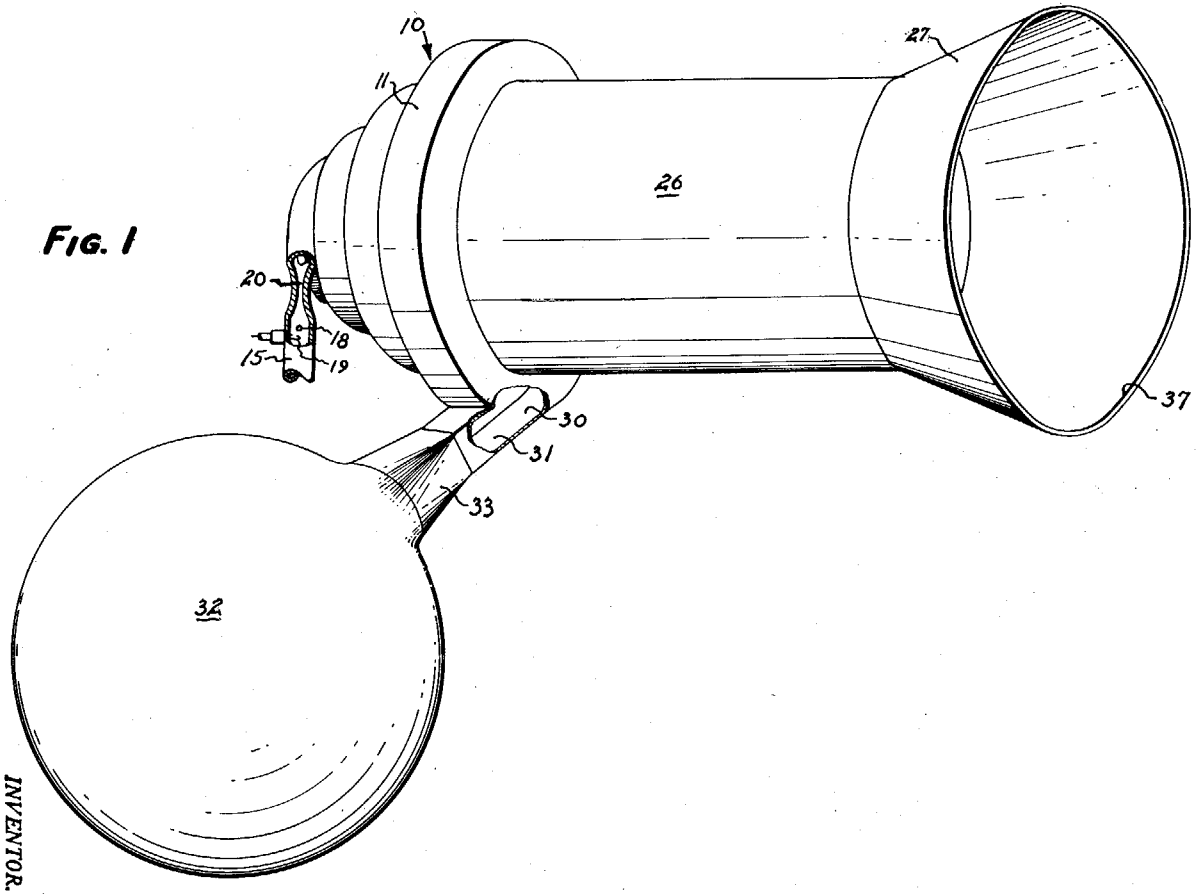
FIG. 1 is a view in perspective and partly in section of a whirlwind vortex vacuum pump embodying the principles of this invention.
Figure 2:
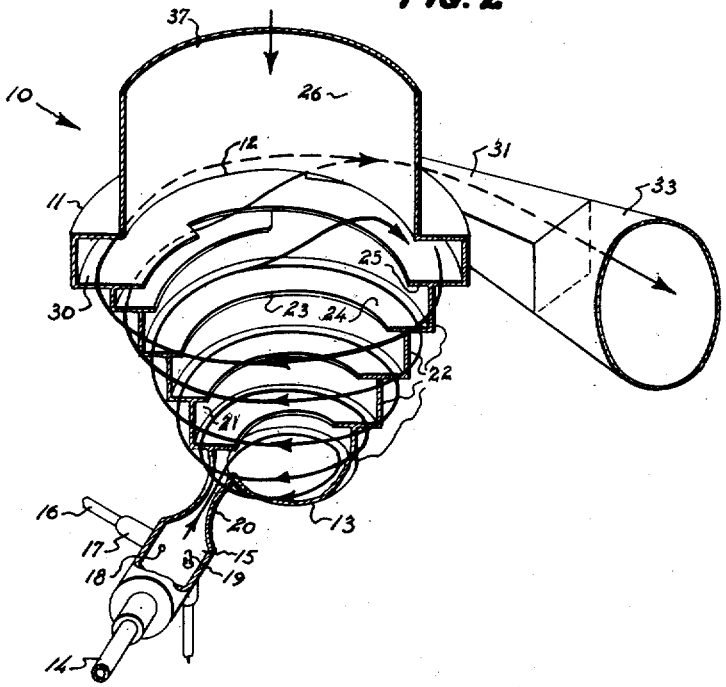
FIG. 2 is another view in perspective of the device of FIG. 1 taken from another angle, with parts broken away shown in section.

The vacuum pump 10 shown in the drawings has an annular housing 11 surrounding a hole 12 that is open to the atmosphere (or other environment, whether gas, water, oil, or whatever) at one end and closed at the opposite end by a plate 13.

Compressed air or gas or superheated steam may be supplied to a pressure line 14 by a conventional compressor (not shown) for use as a pumping fluid. The line 14 is preferably connected to a combustion chamber 15 to which a fuel line 16 leads from a conventional fuel pump (not shown). A fuel injector or throttle 17 preferably is used to inject fuel into the combustion chamber 15 through a fuel nozzle 18. A spark ignition system 19 may be used to ignite the combustible gases in the chamber 15. The high pressure gases in the chamber

15 are then expanded through a nozzle 20 into the housing 11. There, they are directed and forced to spiral around a C-shaped spiral channel 21 which forms a helical-spiral flow path. This spiraled flow of gases produces a vortex which has a pumping action similar to that of a whirlwind or tornado.

The turning radius of the channel 21 increases as the gas flows along its helical spiral path, and the channel 21 has an outer rim 22 that forces the gases to turn, thereby producing a centrifugal force on the gases. The gas pressure at the radially outer side of the channel 21 is therefore greater than the gas pressure at the radially inner side. This inner side is open along a radially inner edge 23, which faces the center of the vortex and opens into the hole 12. The pressure at its rim 23 is less than atmospheric; the pressure on the inside surfaces of the channel 21 may be slightly less than, equal to, or greater than atmospheric, depending upon the operating conditions. These inside surfaces include the upper surface 25, the inner surface of the rim 22, and that portion of the lower channel surface 24 lying radially outward of the inner edge 23 of the flange directly above it. The pressure on the surface portion 24 which lies radially inwardly from the inner edge 23 of the flange directly above it, is less than atmospheric. The resultant suction then produces a vacuum in an intake tube 26, which is at the open end of the hole or vortex 12. Any of numerous types of intake inducers may be provided on the intake tube 26, such as a bell-mouthed intake inducer 27, as shown.

The vacuum may thus be used to pump air and also particles into the center of the high velocity pumping fluid vortex by way of the hole 12. These particles and the intake air are impacted by the high velocity pumping fluid and are drawn into the channel 21 and mixed with the pumping fluid. The mixed fluid in the spiral-helical channel 21 is exhausted via a circular annulus 30, which has a C-shaped cross section like that of the channel 21, and a tangential outlet ducting 31. The ducting 31 may be any suitable length and dimensions and may deliver the pumped particles to any desired receiver, such as a collector 32.

If the vacuum pump 10 is used as a vacuum cleaner, a divergent nozzle 33 may be provided at the end of the ducting 31, as shown in FIG. 1. Thus, the velocity head will be diffused and converted into a pressure head. A porous collector bag 32 may be attached to the outlet of the nozzle 33 so that the gas and air flow out through the pores of the bag 32, while the dust particles etc. collect inside the bag 32.

Figure 3:
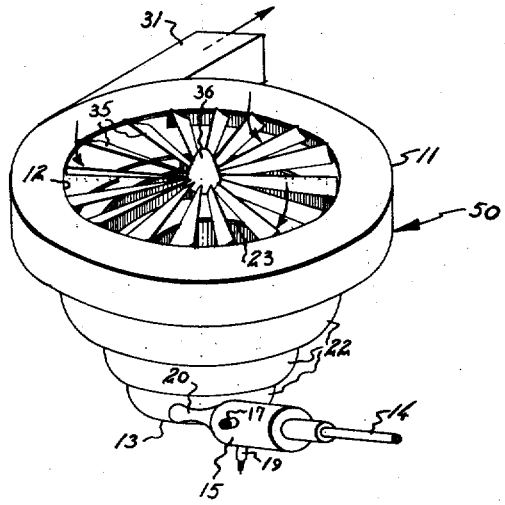
FIG. 3 is a third view in perspective of the whirlwind vortex pump of FIG. 1, taken from a still different angle and showing inlet guide vanes for the intake air.

To increase the efficiency of mixing the intake airstream with the pumping fluid, a cascade of guide vanes 35 may be provided, as shown in FIG. 3; the camber and angle of attack of the guide vanes 35 are designed so that the intake air is forced to turn in the same direction as the vortex. These guide vanes 35 may be secured to a hub cone 36 on the outer side of the hole 12. This cascade of guide vanes 35 is used only when dust, lint, and fine particles are pumped. When large and abrasive particles are pumped, the cascade of guide vanes 35 is omitted.

OPERATION OF THE VACUUM PUMP FOR LARGE AND ABRASIVE PARTICLES

If the particles to be pumped are non-combustible or are not damaged by heat, the compressed-air pumping fluid can be heated in the chamber 15, or superheated steam may be used as the pumping fluid, to give a higher velocity to the pumping fluid, and a greater vacuum in the center of the vortex. When using a combustion arrangement, the pressure and flow of air from the line 14 is adjusted to the desired amount of air flow in the combustion chamber 15; the fuel throttle 17 is then opened, fuel is injected through the nozzles 18 into the combustion chamber 15, and the spark ignition system 19 ignites the combustible gases in the chamber 15. The hot high-pressure gases in the chamber 15 expand through the nozzle 20 and are directed into the housing 11 where they are forced to spiral in the C-shaped spiral channel 21; so they move in a helical-spiral flow path. This spiraled flow of the high velocity pumping fluid produces a vortex with a reduced pressure or partial vacuum at the central hole 12. This vortex resembles a whirlwind or tornado and has a similar vacuum pumping action.

The intake 37 of vacuum pump is placed over the particles that are to be pumped, and these particles are sucked into the hole 12. Their impact with the high-velocity pumping fluid forces these particles to spiral in the helical channel 21 and annulus 30 and are then discharged into the tangential ducting 31, whence they are delivered to the collector 32 or to any desired type of receiver. Care should be taken not to pump particles so large that they can wedge into any of the channels and interfere with the vortex pumping action. When particles of small mass are to be pumped, the air-intake guide vanes 35 may be used to give a more efficient vacuum pumping.

If the particles to be pumped are combustible and are damaged by heat, the fuel line 16 can be turned off or eliminated. Then only the cold compressed air from the line 14 is expanded through the nozzle 20 and used as the pumping fluid.

OPERATION OF THE VACUUM PUMP AS A VACUUM CLEANER FOR PUMPING SMALL MASS PARTICLES

Where small-mass particles are to be pumped, the air-intake guide vanes 35 give a more efficient vacuum pump. The pressure and flow of air from the line 14 is adjusted to the desired amount of air flow required for the pumping action. This high pressure air is expanded through the nozzle 20 and is directed and forced to spiral in the C-shaped spiral channel 21 which forms a helical spiral flow path. This spiral flow of the high velocity pumping fluid produces a vortex with a reduced pressure or partial vacuum at the central hole 12. The intake 37 of the vacuum pump is placed over the object to be cleaned. Air and dust particles are sucked into the intake pipe 26 and directed through the guide vanes 35, which force the intake air to turn in the same direction as the vortex flow of the pumping fluid. Thus two fluids are efficiently mixed and they and the particles are forced to spiral in the helical channel 21 and the annulus 30. Then they are discharged into the tangential ducting 31, diffused through a divergent diffuser 33 where the velocity head is converted to a pressure head, and the fluid is discharged into the porous bag 32. Air flows through the pores of the bag 32, and the dust particles etc. collect in the bag 32.

When certain agriculture crops are pumped in the vortex pump, it may be desirable to use superheated steam, where other hot gases might cause damage. Also it may be advantageous to use superheated steam as a pumping fluid for lifting concentrated ore stones from the bottom of the ocean. The steam can be condensed at the end of each pumping stage, and the resultant water pumped into the ocean. When superheated steam is used, all one needs for the pumping fluid is a steam boiler and a water pump to supply water under pressure to the boiler.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pumping device wherein a partial vacuum is produced by a vortex pumping action of high velocity gases, comprising a helical-spiral conduit, the diameter of the spiral increasing with its length between an inlet nozzle at one end and an outlet at the opposite end, said conduit encompassing a central space and being open on its radially inner side for direct communication with the atmosphere or surrounding environment through said space, said device having a wall connected to said conduit and bounding said space at one end of said spiral and has a suction intake inducer opening into said space at the opposite end of said spiral; and means for supplying high-pressure gases to said inlet nozzle, said high-pressure gases being expanded through said inlet nozzle and its pressure head converted into a high-velocity gas in said conduit, where it is forced to follow said spiral conduit and produce a vortex, whereby atmospheric or environmental fluid and free particles are pulled into said space and exhausted from said outlet.

2. A suction device wherein a partial vacuum is produced by a vortex pumping action of high velocity gases that are expanded from a high pressure hot gas source, comprising a helical-spiral conduit, the diameter of the spiral increasing with its length between an inlet nozzle at one end and an outlet at the opposite end, said conduit being open at its radially inner side for direct communication with the atmosphere or other environment through a central enclosure bounded by said conduit; a tubing and suction intake inducer at one end of said enclosure, said end being that at which said diameter is greatest, said enclosure being closed at the opposite end; means defining a heating chamber connected to said nozzle; means for supplying high-pressure fluid to said chamber; means for heating said high-pressure fluid in said chamber, said high-pressure, hot fluid then being expanded through said inlet nozzle into said conduit where the pressure head of said hot fluid is converted into a high velocity gas stream that is forced to follow said conduit, whereby a vortex flow results in pulling in environmental fluid and mass particles into said enclosure via said tubing and suction intake inducer; and outlet ducting connected to said outlet.

3. A partial vacuum pump having a vortex pumping action by which high-velocity gases are expanded, comprising a helical-spiral conduit, the diameter of the spiral increasing with its length between an inlet nozzle at one end an an outlet at the opposite end, said conduit being open on its radially inner side for direct communication with the atmosphere or other environment through a central enclosure bounded by said conduit and at the end where said conduit diameter is smallest; a suction intake inducer at the opposite end of said enclosure; intake guide vanes between said inducer and said enclosure; and means for supplying high-pressure gases to said inlet nozzle; said high-pressure gases being expanded through said nozzle so that their pressure head is converted into a high-velocity steam following said conduit, whereby a vortex flow results in pulling in fluid from said environment and particles into said enclosure, said intake guide means being shaped to direct the pulled-in fluid and particles to turn in the same direction as the pumping fluid in the conduit.

4. The vacuum pump in claim 3 having a duct connected to said outlet and extending tangentially to the said conduit.

5. The vacuum pump in claim 4 wherein said outlet ducting is provided with divergent diffuser means to convert the fluid velocity to a pressure head.

6. The vacuum pump of claim 3 having means for introducing superheated steam as the high pressure gas to the pump inlet.

7. A pumping device wherein a [parial] *partial* vacuum is produced by a vortex pumping action of high-velocity gases, comprising a helical-spiral conduit, the diameter of the spiral increasing with its length between an inlet at one end and an outlet at the opposite end, said conduit encompassing a central space and being open on its radially inner side for direct communication with the atmosphere or surrounding environment through said space, said device having a wall connected to said conduit and bounding said space at one end of said space and a suction intake inducer opening into said space at the opposite end of said spiral; and means for supplying high-velocity gases to said inlet, said high-velocity gases being forced to follow said spiral conduit and produce a vortex, whereby atmospheric or environment fluid and free particles are pulled into said space and exhausted from said outlet.

8. A partial vacuum pump having a vortex pumping action by which high-velocity gases are expanded, comprising a helical-spiral conduit, the diameter of the spiral increasing with its length between an inlet at one end and an outlet at the opposite end, said conduit being open on its radially inner side for direct communication with the atmosphere or other environment through a central enclosure bounded by said conduit and at the end where said conduit diameter is smallest; a suction intake inducer at the opposite end of said enclosure; intake guide vanes between said inducer and said enclosure; and means for supplying high-velocity gases to said inlet, whereby a vortex flow results in pulling fluid from said environment and particles into said enclosure, said intake guide vanes being shaped to direct the pulled-in fluid and particles to turn in the same direction as the pumping fluid in the conduit.

*9. A pumping device wherein a partial vacuum is produced by a vortex pumping action of high velocity gases, comprising a helical-spiral conduit having an inlet nozzle at one end and an outlet at the opposite end, said conduit encompassing a central space and being open on its radially inner side for direct communication with the atmosphere or surrounding environment through said space, said device having a wall connected to said conduit and bounding said space at one end of said spiral and having a suction intake inducer opening into said space at the opposite end of said spiral; and means for supplying high-pressure gases to said inlet nozzle, said high-pressure gases being expanded through said inlet nozzle and its pressure head converted into a high-velocity gas in said conduit, where it is forced to follow said spiral conduit and produce a vortex, whereby atmospheric or environmental fluid and free particles are pulled into said space and exhausted from said outlet.*

*10. A suction device wherein a partial vacuum is produced by a vortex pumping action of high velocity gases that are expanded from a high pressure hot gas source, comprising a helical-spiral conduit having an inlet nozzle at one end and an outlet at the opposite end, said conduit being open on its radially inner side for direct communication with the atmosphere or other environment through a central enclosure bounded by said conduit; a tubing and suction intake inducer at one end of said enclosure, said end being that at which the diameter is greatest, said enclosure being closed at the opposite end; means defining a heating chamber connected to said nozzle; means for supplying high-pressure fluid to said chamber; means for heating said high-pressure fluid in said chamber, said high-pressure, hot fluid then being expanded through said inlet nozzle into said conduit where the pressure head of said hot fluid is converted into a high velocity gas stream that is forced to follow said conduit, whereby a vortex flow results in pulling in environmental fluid and mass particles into said enclosure via said tubing and suction intake inducer; and outlet ducting connected to said outlet.*

*11. A pumping device wherein a partial vacuum is produced by a vortex pumping action of high-velocity gases, comprising a helical-spiral conduit having an inlet at one end and an outlet at the opposite end, said conduit encompassing a central space and being open on its radially inner side for direct communication with the atmosphere or surrounding environment through said space, said device having a wall connected to said conduit and bounding said space at one end of said space and a suction intake inducer opening into said space at the opposite end of said spiral; and means for supplying high-velocity gases to said inlet, said high-velocity gases being forced to follow said spiral conduit and produce a vortex, whereby atmospheric or environment fluid and free particles are pulled into said space and exhausted from said outlet.*

References Cited in the file of this patent or the original patent

UNITED STATES PATENTS

| | | |
|---|---|---|
| 1,950,828 | Thompson | Mar. 13, 1934 |
| 2,182,165 | Smith | Dec. 5, 1939 |
| 2,519,531 | Worn | Aug. 22, 1950 |

FOREIGN PATENTS

| | | |
|---|---|---|
| 703,690 | France | Feb. 10, 1931 |